(12) United States Patent
Atherton et al.

(10) Patent No.: US 11,609,547 B2
(45) Date of Patent: Mar. 21, 2023

(54) GESTURAL CONTROL OF AN INDUSTRIAL ROBOT

(71) Applicant: Autodesk, Inc., San Francisco, CA (US)

(72) Inventors: Evan Patrick Atherton, San Carlos, CA (US); David Thomasson, Fairfax, CA (US); Maurice Ugo Conti, Muir Beach, CA (US); Heather Kerrick, Oakland, CA (US)

(73) Assignee: AUTODESK, INC., San Francisco, CA (US)

( * ) Notice: Subject to any disclaimer, the term of this patent is extended or adjusted under 35 U.S.C. 154(b) by 291 days.

(21) Appl. No.: 15/384,193

(22) Filed: Dec. 19, 2016

(65) Prior Publication Data

US 2018/0173200 A1   Jun. 21, 2018

(51) Int. Cl.
*G05B 19/40* (2006.01)
*B25J 9/16* (2006.01)
(Continued)

(52) U.S. Cl.
CPC ........ *G05B 19/4097* (2013.01); *B25J 9/1664* (2013.01); *B25J 19/021* (2013.01); *G05B 19/409* (2013.01); *G06V 40/28* (2022.01); *G05B 2219/35313* (2013.01); *G05B 2219/35444* (2013.01); *G05B 2219/37074* (2013.01); *G06V 2201/06* (2022.01); *Y02P 90/02* (2015.11)

(58) Field of Classification Search
CPC .............. G05B 19/4097; G05B 19/409; G05B 2219/37074; G05B 2219/35313; G06K 9/00355; G06K 2209/19; B25J 19/021; B25J 9/1664
See application file for complete search history.

(56) References Cited

U.S. PATENT DOCUMENTS 5,662,566 A * 9/1997 Marxrieser ........ G05B 19/4099
483/1
6,421,048 B1 * 7/2002 Shih ........................ G06F 3/016
345/419

(Continued)

FOREIGN PATENT DOCUMENTS

CN          102009323 A1 * 4/2011 ........... G05B 19/418
DE     102016120132 A1 * 10/2016 ............. B07C 7/005

OTHER PUBLICATIONS

Dimic, Z., Milutinovic, D., Zivanovic, S., and Kvrgic, V., "Virtual Environment in Control and Programming System for Reconfigurable Machining Robot", Tehnički vjesnik, vol. 23, No. 6, Nov. 6, 2016, ISSN 1330-3651 (Print), ISSN 1848-6339 (Online) DOI: 10.17559/TV-20150210133556. (Year: 2016).*

(Continued)

*Primary Examiner* — Mohammad Ali
*Assistant Examiner* — Kelvin Booker
(74) *Attorney, Agent, or Firm* — Artegis Law Group, LLP

(57) ABSTRACT

A robot system is configured to identify gestures performed by an end-user proximate to a work piece. The robot system then determines a set of modifications to be made to the work piece based on the gestures. A projector coupled to the robot system projects images onto the work piece that represent the modification to be made and/or a CAD model of the work piece. The robot system then performs the modifications.

20 Claims, 5 Drawing Sheets

(51) Int. Cl.
    *B25J 19/02*         (2006.01)
    *G05B 19/4097*    (2006.01)
    *G05B 19/409*     (2006.01)
    *G06V 40/20*      (2022.01)

(56) References Cited

U.S. PATENT DOCUMENTS

| | | | | |
|---|---|---|---|---|
| 6,542,925 | B2* | 4/2003 | Brown | G05B 19/408 |
| | | | | 700/230 |
| 8,032,605 | B2* | 10/2011 | Brown | G05B 19/4185 |
| | | | | 700/1 |
| 9,671,777 | B1* | 6/2017 | Aichele | G05B 19/4069 |
| 9,772,394 | B2* | 9/2017 | Nagalla | G06F 3/017 |
| 9,811,074 | B1* | 11/2017 | Aichele | G05B 19/4069 |
| 10,058,995 | B1* | 8/2018 | Sampedro | B25J 9/163 |
| 10,162,329 | B2* | 12/2018 | Ndip-Agbor | G05B 19/29 |
| 10,406,686 | B2* | 9/2019 | Boca | B25J 9/1697 |
| 10,427,296 | B1* | 10/2019 | Sampedro | B25J 9/163 |
| 2004/0111178 | A1* | 6/2004 | Saarela | B44B 3/009 |
| | | | | 700/193 |
| 2005/0149231 | A1* | 7/2005 | Pretlove | B25J 9/1671 |
| | | | | 700/264 |
| 2005/0256611 | A1* | 11/2005 | Pretlove | G05B 19/42 |
| | | | | 700/264 |
| 2008/0065243 | A1* | 3/2008 | Fallman | G05B 19/409 |
| | | | | 700/83 |
| 2008/0177410 | A1* | 7/2008 | Carbonera | B44B 1/006 |
| | | | | 700/98 |
| 2008/0243456 | A1* | 10/2008 | Hudetz | G06F 30/17 |
| | | | | 703/7 |
| 2010/0150399 | A1* | 6/2010 | Svajda | G06K 9/00355 |
| | | | | 382/103 |
| 2013/0222580 | A1* | 8/2013 | Kurahashi | B23Q 17/2409 |
| | | | | 348/135 |
| 2013/0249784 | A1* | 9/2013 | Gustafson | G01R 33/072 |
| | | | | 345/156 |
| 2015/0049081 | A1* | 2/2015 | Coffey | G06T 19/006 |
| | | | | 345/419 |
| 2015/0055086 | A1* | 2/2015 | Fonte | G02C 13/005 |
| | | | | 700/98 |
| 2015/0085095 | A1* | 3/2015 | Tesar | G02B 21/367 |
| | | | | 359/613 |
| 2015/0277398 | A1* | 10/2015 | Madvil | B25J 9/1671 |
| | | | | 901/3 |
| 2015/0314442 | A1* | 11/2015 | Boca | B25J 9/1664 |
| | | | | 700/253 |
| 2015/0321427 | A1* | 11/2015 | Gunnarsson | G05B 19/4099 |
| | | | | 700/98 |
| 2015/0324490 | A1* | 11/2015 | Page | G05B 19/4183 |
| | | | | 700/98 |
| 2016/0184032 | A1* | 6/2016 | Romo | A61B 10/04 |
| | | | | 606/130 |
| 2016/0260261 | A1* | 9/2016 | Hsu | G06T 1/20 |
| 2016/0267806 | A1* | 9/2016 | Hsu | G09B 19/00 |
| 2016/0303737 | A1* | 10/2016 | Rossano | B25J 9/1656 |
| 2017/0130648 | A1* | 5/2017 | Jochman | F02B 63/04 |
| 2017/0143442 | A1* | 5/2017 | Tesar | A61B 90/37 |
| 2018/0092698 | A1* | 4/2018 | Chopra | G06F 1/163 |
| 2018/0361593 | A1* | 12/2018 | Rossano | B25J 13/025 |
| 2019/0243344 | A1* | 8/2019 | Bauer | G05B 19/401 |
| 2019/0275744 | A1* | 9/2019 | Tsoutsos | B33Y 50/02 |

OTHER PUBLICATIONS

Lambrecht, J., Kleinsorge, M., Rosenstrauch, M. and Krüger, J., "Spatial Programming for Industrial Robots Through Task Demonstration", May 10, 2012, Intl Journal of Advanced Robotic Systems, vol. 10.. (Year: 2012).*

Nee, A.Y.C., Ong, S.K., Chryssolouris, G. and Mourtzis, D., "Augmented reality applications in design and manufacturing", CIRP Annals—Manufacturing Technology 61 (2012) 657-679. (Year: 2012).*

Neto.P., Pires, J.N., and Moreira, A.P., "High-level programming and control for industrial robotics: using a hand-held accelerometer-based input device for gesture and posture recognition", 2010, Industrial Robot 37(2):137-147. (Year: 2010).*

Fleischer et al., "Workpiece and Tool Handling in Metal Cutting Machines", 2006, Annals of the CIRP vol. 55/2/2006. (Year: 2006).*

* cited by examiner

GESTURAL CONTROL OF AN INDUSTRIAL ROBOT

BACKGROUND OF THE INVENTION

Field of the Invention

Embodiments of the present invention relate generally to robotics and, more specifically, to gestural control of an industrial robot.

Description of the Related Art

In a modern manufacturing environment, industrial robots are used to automate certain tasks. For example, in the automotive industry, conventional industrial robots could weld together members of vehicle frames or perform riveting operations on various vehicle parts. Such robots are typically programmed to perform specific tasks before being deployed into the manufacturing environment.

During programming, a team of engineers determines a set of tool paths that the industrial robot should execute when performing various tasks. Tool paths can be defined using a low-level machine language such as G-code, among other possibilities. When performing a given task, an industrial robot executes the G-code associated with that task. To assist with the process of generating G-code, a variety of computer-aided manufacturing (CAM) libraries exist that generate tool paths based on a computer-aided design (CAD) model. Accordingly, the team of engineers may generate a CAD model and then process this model, using one or more of the aforementioned libraries, to generate G-code for programming the industrial robot. However, this approach suffers from two primary drawbacks.

First, industrial robots can only be programmed while offline. This constraint limits the ability of engineers to quickly generate new industrial robot programs or modify existing industrial robot programs. For example, to test a new or modified program, an engineer would need to take the robot offline, modify the CAD model, generate new G-code, bring the robot online again, and then cause the robot to execute the G-code to verify correct operation. This test cycle is lengthy and tedious and prone to human error. Further, the engineers may need to perform the test cycle multiple times in order to identify and correct any errors in the industrial robot program, further extending the length and tediousness of the test cycle.

Second, with the above approach, the engineers do not have direct visibility into the G-code being used to program the industrial robots. For example, suppose an engineer generates G-code for the industrial robot using a CAM library. Because the engineer does not see in a real-world context the actual tool paths defined virtually by the CAM library, the engineer does not have specific knowledge of the actual tasks the industrial robot is being programmed to perform. Consequently, the engineer lacks the appropriate information to detect and debug flaws in the operation of the industrial robot upon execution of the G-code. This limitation leads to longer test cycles as well, which are problematic for the reasons described above.

As the foregoing illustrates, what is needed in the art is improved more effective approach for programming and operating industrial robots.

SUMMARY OF THE INVENTION

Various embodiments of the present invention set forth a computer-implemented method for controlling a robot, including processing sensor data to determine a first gesture performed by an end-user proximate to a work piece, generating a tool path for modifying the work piece based on the first gesture, projecting the tool path onto the work piece, and causing the robot to modify the work piece according to the tool path.

At least one advantage of the techniques described herein is that an end-user can program the robot system without needing to first take the robot offline. Accordingly, the end-user can program the robot system dynamically while the robot operates.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
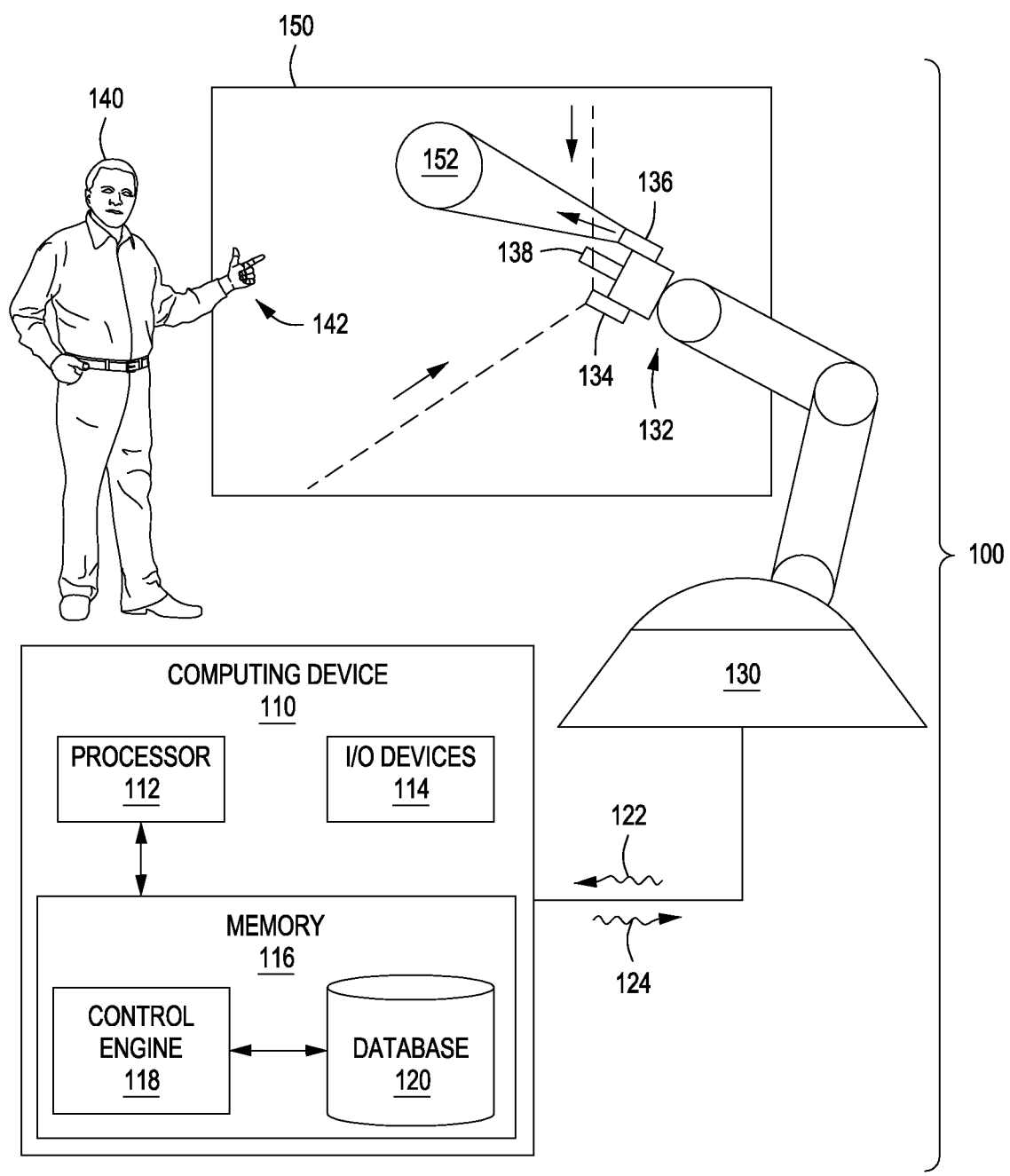
FIG. 1 illustrates a system configured to implement one or more aspects of the present invention.

FIG. 1 illustrates a system configured to implement one or more aspects of the present invention. As shown, robot system 100 includes a computing device 110 coupled to a robot 130. Robot 130 is configured to interact with an end-user 140 in order to apply modifications to a workpiece 150. Robot 130 may be any technically feasible robotic device, including an articulated robot such as that shown. Work piece 150 may be any technically feasible type of structure.

Computer 110 includes processor 112, input/output (I/O) utilities 114, and memory 116, coupled together. Processor 112 may be any technically feasible form of processing device configured process data and execute program code. Processor 112 could be, for example, a central processing unit (CPU), a graphics processing unit (GPU), an application-specific integrated circuit (ASIC), a field-programmable gate array (FPGA), any technically feasible combination of such units, and so forth.

I/O utilities 114 may include devices configured to receive input, including, for example, a keyboard, a mouse, and so forth. I/O utilities 114 may also include devices configured to provide output, including, for example, a display device, a speaker, and so forth. I/O utilities 114 may further include devices configured to both receive and provide input and output, respectively, including, for example, a touchscreen, a universal serial bus (USB) port, and so forth.

Memory 116 may be any technically feasible storage medium configured to store data and software applications. Memory 116 could be, for example, a hard disk, a random access memory (RAM) module, a read-only memory (ROM), and so forth. Memory 116 includes a control engine 118 and a database 120. Control engine 128 is a software program that, when executed by processor 112, controls robot 130. In doing so, control engine 118 processes sensor data 122 received from robot 130 to generate control signals 124 for controlling robot 130, as described in greater detail below.

Robot 130 includes a head unit 132 that, in turn, includes a sensor array 134, a projector 138, and an implement 138. Sensor array 134 may include video sensors, audio sensors, and any other technically feasible type of sensor. Sensor array 134 is configured to gather sensor data 122 associated with end-user 140 and/or workpiece 150. Projector 136 may include one or more elements that generate light. Projector 136 is configured to project images onto workpiece 150. Implement 138 may be any technically feasible type of machine tool, including a router, a drill, a welding unit, and so forth. Implement 138 is configured to modify work piece 150.

In operation, sensor array 134 captures sensor data 122 that represents one or more gestures 142 performed by end-user 140 relative to work piece 150 and/or topographic information associated with work piece 150. A gesture 142 could be, for example, a pointing gesture, a sweeping hand gesture, a pinching gesture, and so forth. The topographic information could represent the surface of work piece 150, for example, and may be used to generate a CAD model of work piece 150. Control engine 118 processes sensor data 122 and interprets gestures 142 as commands for modifying work piece 150. Control engine 118 then generates control signals 124 for controlling robot 130 relative to work piece 150.

Based on control signals 124, projector 136 projects one or more images 152 onto work piece 152. Images 152 may include tool paths along which robot 130 performs modifications to work piece 150 in response to gestures 142. Images 152 may also include the CAD model of work piece 150 mentioned above and/or a CAD model of illustrating modifications to be made to work piece 150 via implement 138.

To modify work piece 150, robot 130 executes various mechatronic articulations, based on control signals 124, to move head unit 132 relative to work piece 150. In doing so, head unit 132 physically couples implement 138 to work piece 150 to adjust the physical structure of work piece 150. In conjunction with modifying work piece 150 in this manner, control engine 118 may also dynamically update images 152 to reflect the progress of the modifications and/or additional gestures 142 received from end-user 140. Control engine 118 is described in greater detail below.

Figure 2:
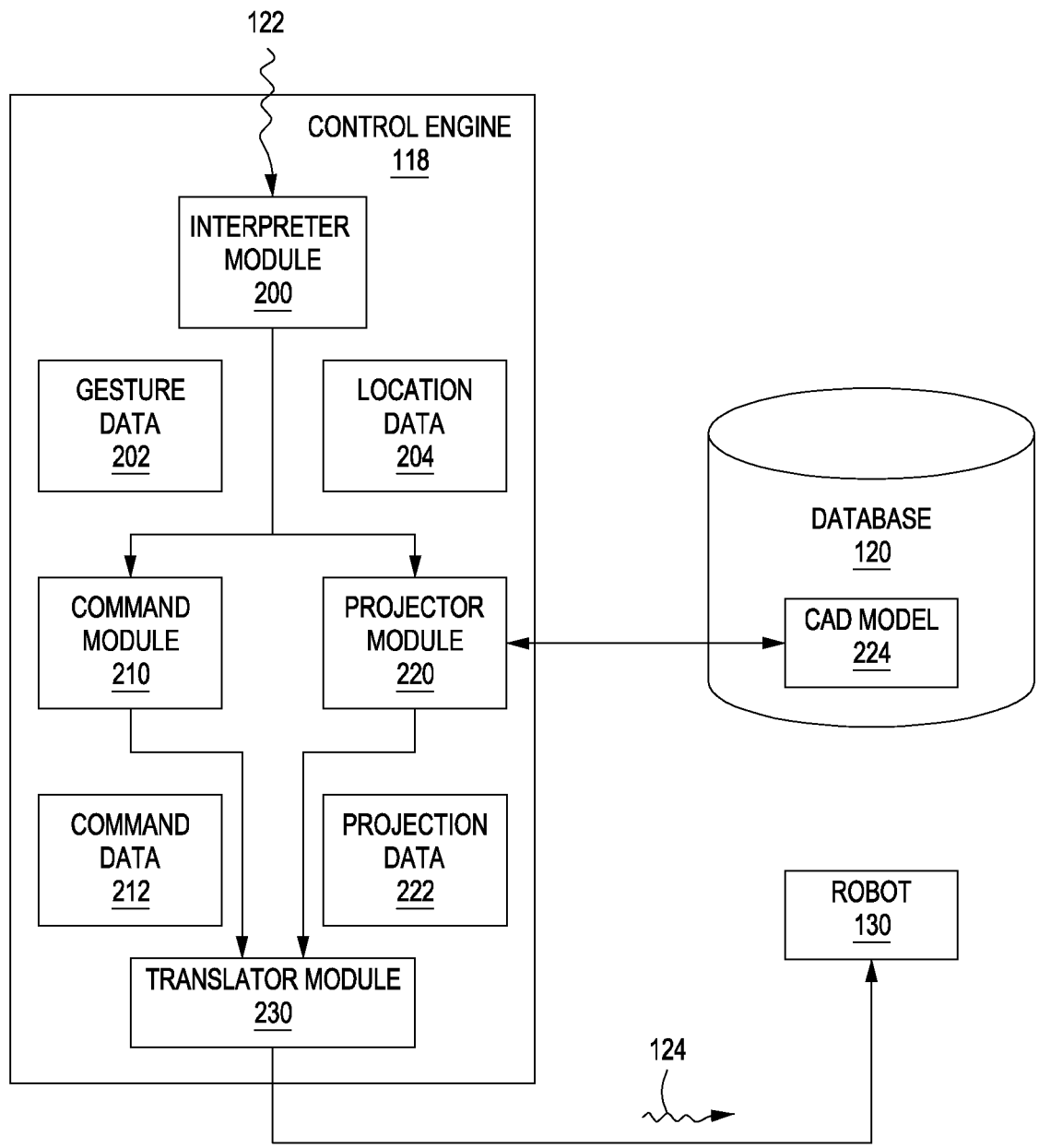
FIG. 2 is a more detailed illustration of the control engine of FIG. 1, according to various embodiments of the present invention.

FIG. 2 is a more detailed illustration of the control engine of FIG. 1, according to various embodiments of the present invention. As shown, control engine 118 includes an interpreter module 200, a command module 210, a projector module 220, and a translator module 230.

Interpreter module 200 is configured to receive sensor data 122 from sensor array 134 and to process this data to generate gesture data 202 and location data 204. Gesture data 202 indicates the specific gestures performed by end-user 140. For example, gesture data 202 could indicate that end-user 140 performs a pointing gesture. Location data 204 indicates one or more locations associated with the gestures performed by end-user 140. For example, location data 204 could indicate a specific position on work piece 150 where end-user 140 points.

Command module 210 receives gesture data 202 and location data 204 from interpreter module 200. Based on this data, command module 210 generates command data 212. Command data 212 indicates specific operations that robot 130 is to execute, relative to work piece 150, in response to the gestures performed by end-user 140. Command data 212 may include high-level commands reflecting general tasks for robot 130 to perform, or low-level instructions specifying precise dynamics for robot 130 to implement.

Projector module 220 also receives gesture data 202 and location data 204 and, based on this data, generates projection data 22. Projection data 222 includes images to be projected onto work piece 150 and instructions for projecting those images. The images may include, as mentioned, operations to be performed by robot 130 relative to work piece 150. Those images may also include one or more CAD models 224 stored in database 120. A given CAD model 224 may be a CAD model of the present state of work piece 150, as determined by control engine 118 based on sensor data 122, or a predictive CAD model of work piece 150 after robot 130 performs modifications to work piece 150.

Translator module 230 receives command data 212 and projection data 222 and translates this data into control signals 124. Control signals 124 may include G-code for articulating robot 130, controlling projector 136, or operating implement 138. Translator module 230 transmits control signals 124 to robot 130. Based on these signals, robot 130 performs the operations described above with work piece 150.

Figure 3A:
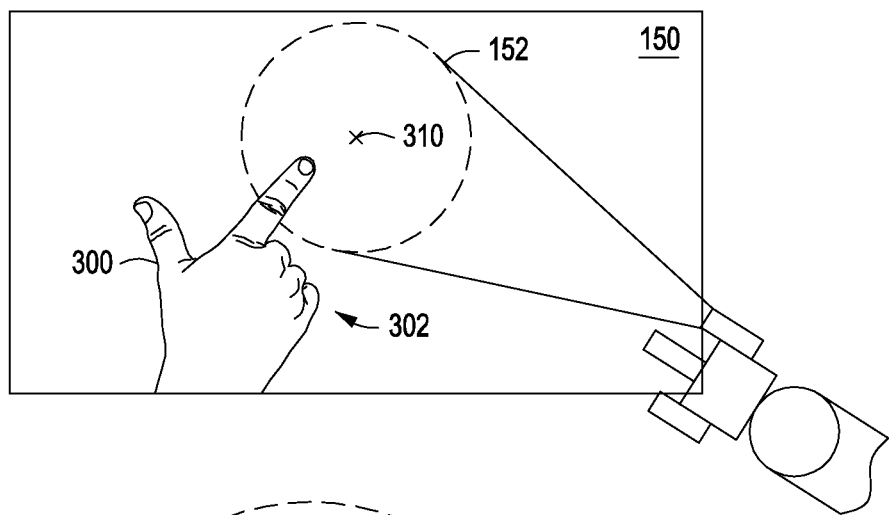
FIGS. 3A-3C illustrate exemplary gestures an end-user performs to program the robot of FIG. 1, according to various embodiments of the present invention.
Figure 3B:
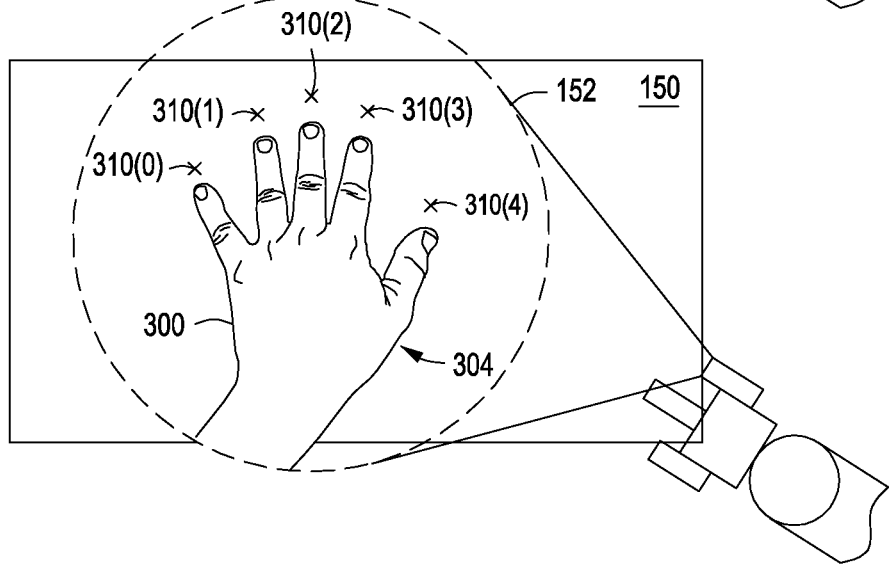
Figure 3C:
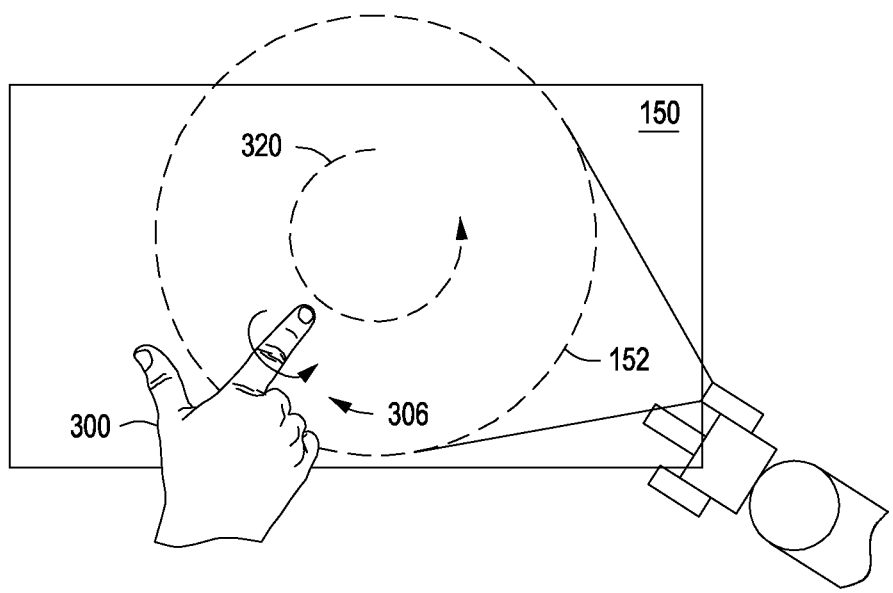
Figure 4A:
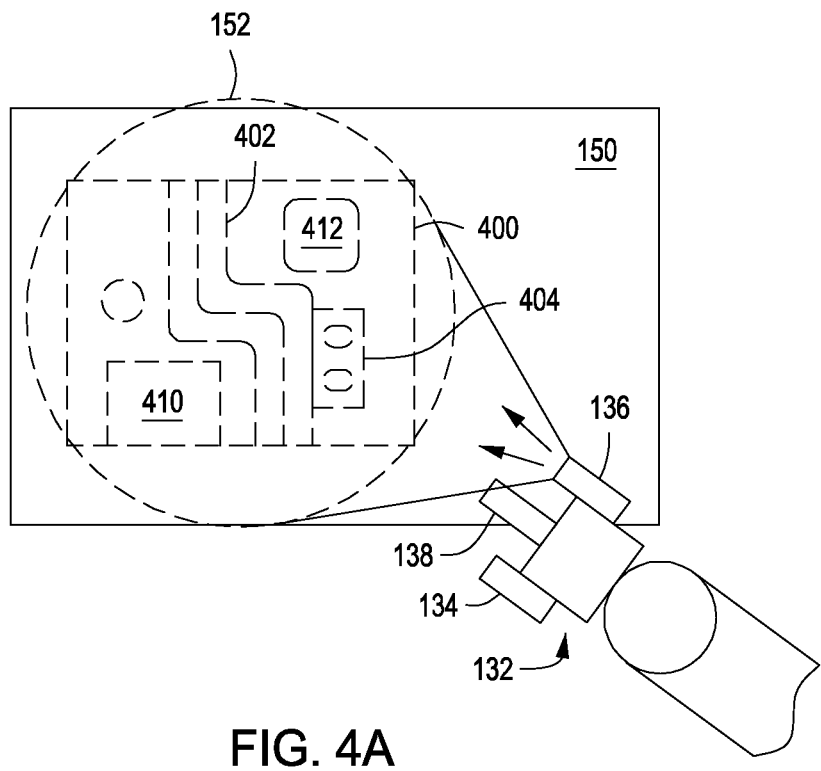
FIGS. 4A-4B illustrate exemplary CAD models projected onto a work piece by the robot of FIG. 1, according to various embodiments of the present invention.
Figure 4B:
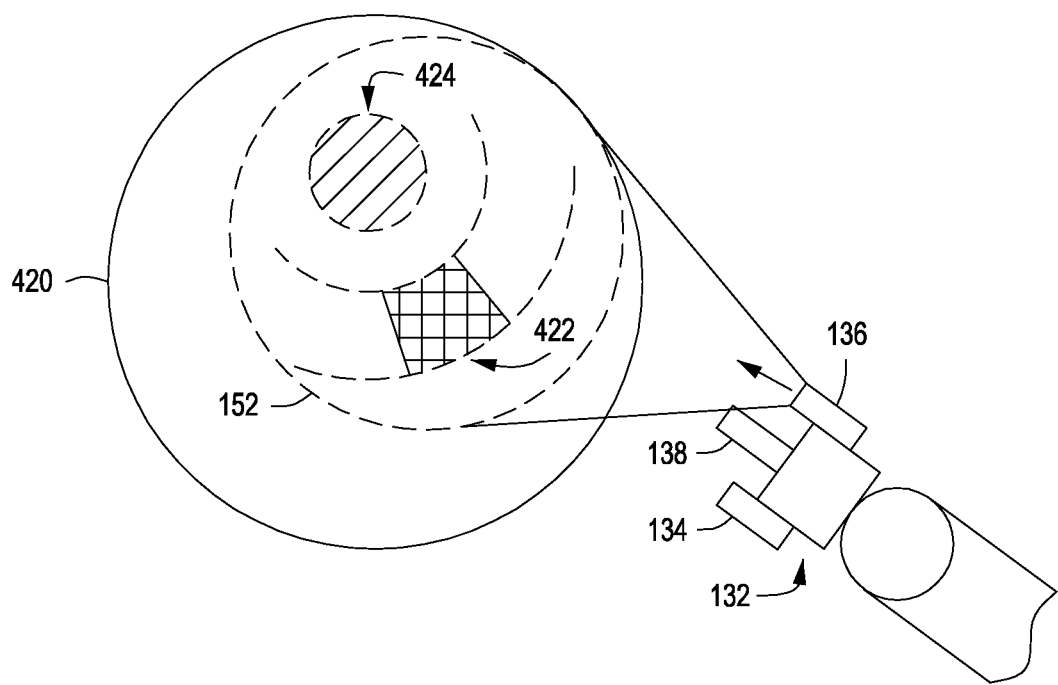
Figure 5:
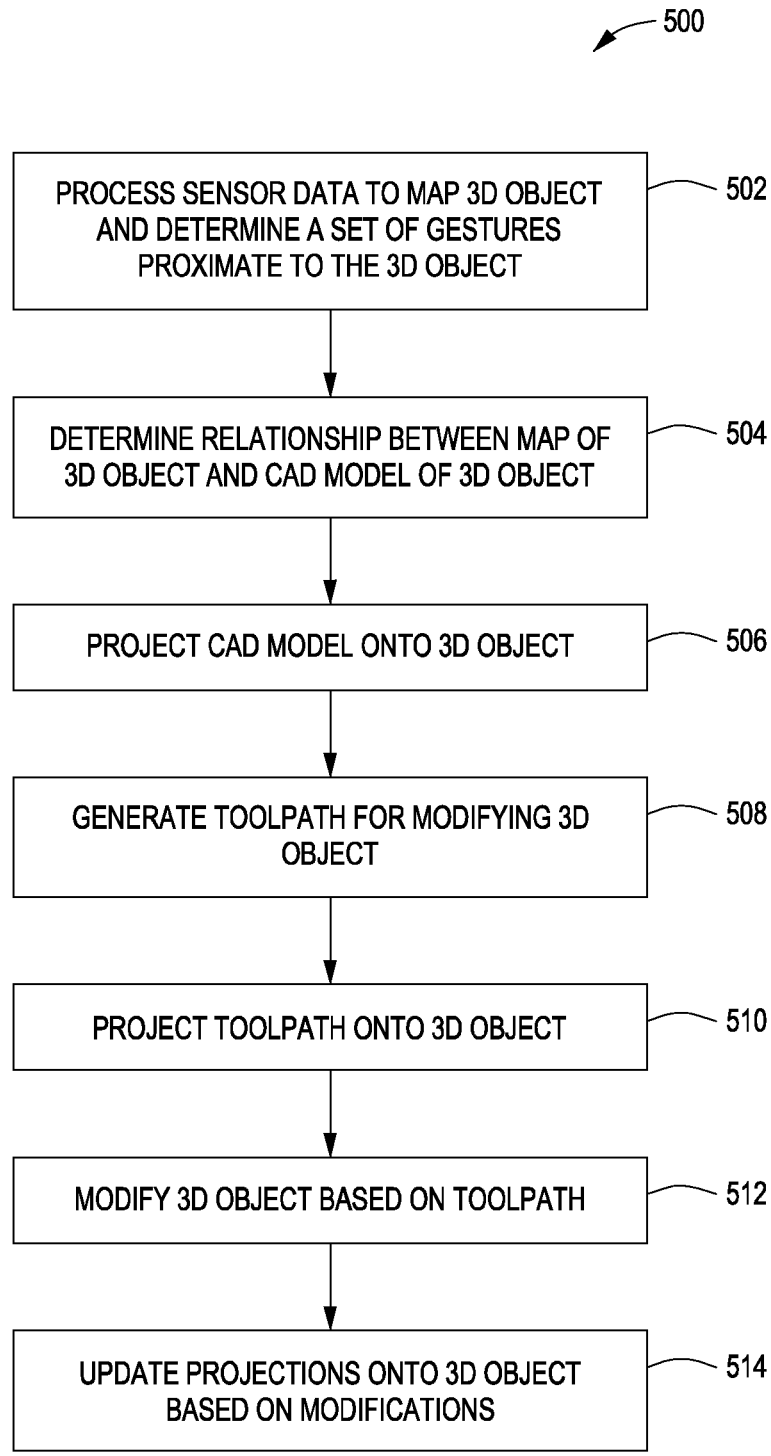
FIG. 5 is a flow diagram of method steps for programming a robot using hand gestures, according to various embodiments of the present invention.

Referring generally to FIGS. 1-2, one advantage of the techniques described above is that end-user 140 can program robot 130 to perform a range of operations while robot 130 is online and operational. Accordingly, robot 130 need not be taken offline to adjust the programming of that robot. In addition, because projector 136 projects images onto work piece 150 to represent that programming, end-user 140 is provided with greater insight into the operation of robot 130. FIGS. 3A-3C illustrate examples of gestures that control engine 118 may detect and interpret as programming for robot 130. FIGS. 4A-4B illustrate examples of images that control engine 118 may generate and project onto work piece 150. FIG. 5 illustrates the overall operation of robot 130 in stepwise fashion.

Exemplary Operation of an Industrial Robot

FIGS. 3A-3C illustrate exemplary gestures an end-user performs to program the robot of FIG. 1, according to various embodiments of the present invention. Persons skilled in the art will understand that FIGS. 3A-3C are provided for exemplary purposes only and not meant to limit the scope of the invention.

As shown in FIG. 3A, hand 300 of end-user 140 performs a pointing gesture 302 relative to work piece 150. Sensor array 134 captures sensor data 122 that represents gesture 302, and control engine 118 then interprets this gesture as indicating that a hole should be drilled at a particular location on work piece 150. Control engine 118 then causes projector 136 to project image 152 onto work piece 150. In this example, image 152 includes a marker 310 indicating the precise location of work piece 150 where the hole should be drilled. Control engine 118 may then cause robot 130 to drill the hole using implement 138.

As shown in FIG. 3B, hand 300 of end-user 140 performs a multi-pointing gesture 304 relative to work piece 150. Sensor array 134 captures sensor data 122 that represents gesture 304, and control engine 118 then interprets this gesture as indicating that multiple holes should be drilled at different locations on work piece 150. Control engine 118 then causes projector 136 to project image 152 onto work piece 150. In this example, image 152 includes markers 310(0) through 310(4) indicating the precise locations of work piece 150 where the holes should be drilled. Control engine 118 may then cause robot 130 to drill the holes using implement 138.

As shown in FIG. 3C, hand 300 of end-user 140 performs a sweeping-pointing gesture 306 relative to work piece 150. Sensor array 134 captures sensor data 122 that represents gesture 306, and control engine 118 then interprets this gesture as indicating that an arc should be cut across the surface of work piece 150. Control engine 118 then causes projector 136 to project image 152 onto work piece 150. In this example, image 152 includes a toolpath 320 indicating the precise trajectory across the surface of work piece 150 where the arc should be cut. Control engine 118 may then cause robot 130 to cut that arc using implement 138.

In addition to the exemplary gestures shown in FIGS. 3A-3C, control engine 118 may also interpret a wide variety of other gestures performed by end-user 140 related to various types of manufacturing operations. Those gestures may relate to cutting, drilling, welding, soldering, applying fasteners such as nails or staples, spraying paint, applying lubricants, writing symbols, etching, performing lithography, executing an electrochemical deposition process, and so forth, without limitation. As a general matter, control engine 118 may be configured to process and interpret any conceivable gesture to perform any technically feasible type of manufacturing task.

FIGS. 4A-4B illustrate exemplary CAD models projected onto a work piece by the robot of FIG. 1, according to various embodiments of the present invention. Persons skilled in the art will understand that FIGS. 4A-4B are provided for exemplary purposes only and not meant to limit the scope of the invention.

As shown in FIG. 4A, projector 136 projects image 152 onto work piece 150. In this example, work piece 150 is a wall. Image 152 includes a CAD model 400 that represents the internal structure of that wall. Specifically, CAD model 400 includes electrical conduit 402 and junction box 404. CAD model 400 may also indicate modifications 410 and 412 to be made to work piece 150. Here, those modifications represent holes to be cut into the wall at locations that avoid contact with conduit 402 and junction box 404.

As shown in FIG. 4B, projector 136 projects image 152 onto work piece 150 that, in this example, is depicted as a three-dimensional (3D) object. Image 152 includes a CAD model 420 that represents a prediction of how work piece 150 will appear after robot 130 performs modifications to that work piece. In particular, CAD model 420 includes internal surface features 422 anticipated to be present after modifications are made, as well as an exit hole 424 predicted to be present following those modifications. Control engine 118 may generate surface features 422 based on a model of a manufacturing process to be performed. Control engine 118 may generate imagery for exit hole 424 that depicts portions of the environment on the other side of work piece 150.

Referring generally to FIGS. 4A-4B, control engine 118 may project any technically feasible type of image 152 and/or sequence of images 152 onto work piece 150. Control engine 118 may also dynamically update images 152 in order to depict ongoing modifications or in-progress performed by robot 130 and/or predicted effects of those modifications. In addition, control engine 118 may identify modifications that the end-user applies to the images of CAD models, thereby allowing the end-user to modify those images in real time.

Programming an Industrial Robot Via Gestures

FIG. 5 is a flow diagram of method steps for programming a robot using gestures, according to various embodiments of the present invention. Although the method steps are described in conjunction with the systems of FIGS. 1-4B, persons skilled in the art will understand that any system configured to perform the method steps, in any order, is within the scope of the present invention.

As shown, a method 500 begins at step 502, where control engine 118 processes sensor data to map the surface of a 3D object and determine a set of gestures performed by end-user 140 relative to that 3D object. The 3D object could be work piece 150 or any other physical object. In mapping the 3D object, control engine 118 may generate a CAD model of the 3D object or any other technically feasible representation of the 3D object. The gestures determined by control engine 118 could be any of the hand gestures depicted above, for example.

At step 504, control engine 118 determines one or more locations on the 3D object associated with the gestures determined at step 502. The locations could represent points, arcs, regions, or other area of the 3D location where modifications should be performed.

At step 506, control engine 118 projects the CAD model generated at step 502 onto the 3D object. The CAD model may depict any feature of the 3D object, including the internal structure of that object, and may appear at or near the locations determined at step 504.

At step 508, control engine 118 generates a tool path for modifying the 3D object. The tool path may correspond to one or more locations determined at step 504, and may represent holes to be drilled, arcs to be cut, or any other technically feasible manufacturing operation to be performed.

At step 510, control engine 118 projects the tool path generated at step 508 onto the 3D object. In doing so, control engine 118 effectively outputs the current programming of robot 130 generated in response to the gestures performed by end-user 140 and determined at step 502.

At step 512, control engine 118 causes robot 130 to modify the 3D object via implement 138. In doing so, control engine 118 outputs control signals to robot 130 that dictate the dynamics of robot 130 and the operation of implement 138.

At step 514, control engine 118 updates the images projected onto the 3D object based on the modifications made to that object at step 512. In this manner, control engine 118 may maintain a dynamically updated view of the progress of the operations performed by robot 130, and the predicted effects of those modifications.

In sum, a robot system is configured to identify gestures performed by an end-user proximate to a work piece. The robot system then determines a set of modifications to be made to the work piece based on the gestures. A projector coupled to the robot system projects images onto the work piece that represent the modification to be made and/or a CAD model of the work piece. The robot system then performs the modifications.

At least one advantage of the disclosed approach is that an end-user can program the robot system without needing to first take the robot offline. Accordingly, the end-user can program the robot system dynamically while the robot operates. In addition, the end-user is provided with more detailed knowledge of the modifications the robot makes via the images projected onto the work piece. This allows the end-user to make corrections and/or adjustments with greater efficiency, further improving the programming process.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for controlling a robot, the method comprising:
processing sensor data to determine a first gesture performed by an end-user proximate to a work piece;
generating a tool path for modifying the work piece based on the first gesture;
projecting a first image that includes the tool path onto the work piece;
causing the robot to modify the work piece according to the tool path;
dynamically updating the first image to generate an updated first image while the robot modifies the work piece; and
projecting the updated first image onto the work piece.

2. The computer-implemented method of claim 1, further comprising projecting a second image that includes a CAD model onto a first surface of the work piece.

3. The computer-implemented method of claim 2, wherein the second image that includes the CAD model depicts an internal portion of the work piece proximate to the first surface.

4. The computer-implemented method of claim 2, wherein the second image that includes the CAD model depicts at least one predicted effect of modifying the work piece according to the tool path.

5. The computer-implemented method of claim 2, further comprising generating the CAD model based on the sensor data.

6. The computer-implemented method of claim 1, wherein the first gesture indicates two or more locations on the work piece where modifications are to be made, and wherein the tool path intersects the two or more locations.

7. The computer-implemented method of claim 1, wherein the first gesture comprises a pointing gesture indicating a location on the work piece where a hole should be drilled.

8. The computer-implemented method of claim 1, wherein the first gesture comprises a sweeping gesture indicating an arc on a surface of the work piece along which a cut should be made.

9. A non-transitory computer-readable medium storing program instructions that, when executed by a processor, cause the processor to control a robot by performing the steps of:
    processing sensor data to determine a first gesture performed by an end-user proximate to a work piece;
    generating a tool path for modifying the work piece based on the first gesture;
    projecting a first image that includes the tool path onto the work piece;
    causing the robot to modify the work piece according to the tool path;
    dynamically updating the first image to generate an updated first image while the robot modifies the work piece; and
    projecting the updated first image onto the work piece.

10. The non-transitory computer-readable medium of claim 9, the steps further comprising projecting a second image that includes a CAD model onto a first surface of the work piece.

11. The non-transitory computer-readable medium of claim 10, wherein the second image that includes the CAD model depicts an internal portion of the work piece proximate to the first surface.

12. The non-transitory computer-readable medium of claim 10, wherein the second image that includes the CAD model depicts at least one predicted effect of modifying the work piece according to the tool path.

13. The non-transitory computer-readable medium of claim 10, the steps further comprising generating the CAD model based on the sensor data.

14. The non-transitory computer-readable medium of claim 9, wherein the first gesture indicates two or more locations on the work piece where modifications are to be made, and wherein the tool path intersects the two or more locations.

15. The non-transitory computer-readable medium of claim 9, wherein the first gesture comprises a pointing gesture indicating a location on the work piece where a hole should be drilled.

16. The non-transitory computer-readable medium of claim 9, wherein the first gesture comprises a sweeping gesture indicating an arc on a surface of the work piece along which a cut should be made.

17. A system, comprising:
    a robot;
    a memory storing a control engine; and
    a processor that, upon executing the control engine, is configured to:
        process sensor data to determine a first gesture performed by an end-user proximate to a work piece,
        generate a tool path for modifying the work piece based on the first gesture,
        project an image that includes the tool path onto the work piece,
        cause the robot to modify the work piece according to the tool path,
        dynamically update the image to generate an updated image while the robot modifies the work piece; and
        project the updated image onto the work piece.

18. The system of claim 17, wherein the robot includes a sensor array configured to capture the sensor data.

19. The system of claim 17, wherein the robot includes a projector that is configured to project the image that includes the tool path onto the work piece.

20. The system of claim 17, wherein the robot comprises an articulated arm robot.

* * * * *